(No Model.)
F. RITTENHOUSE.
VELOCIPEDE.
No. 266,527. Patented Oct. 24, 1882.
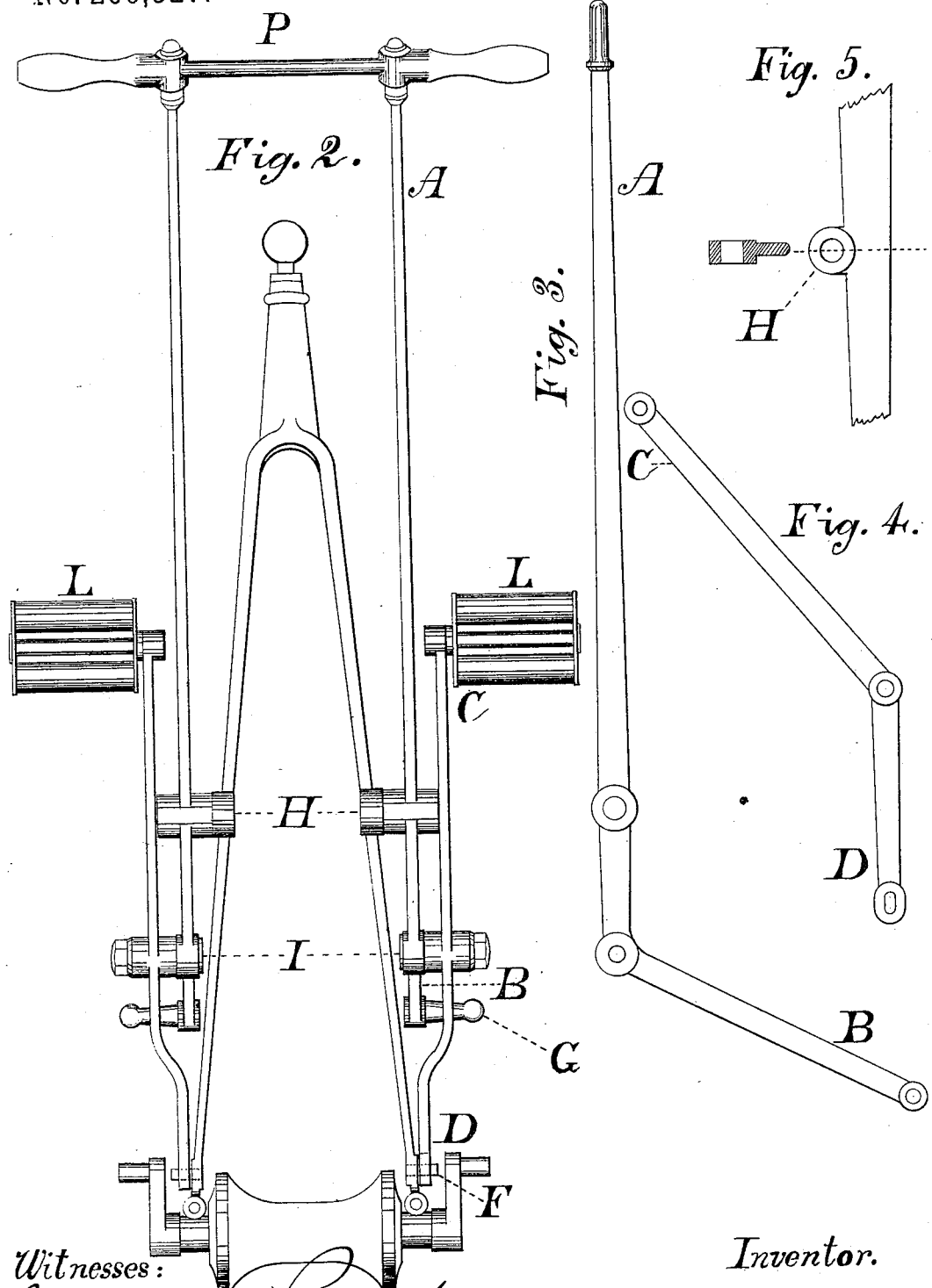

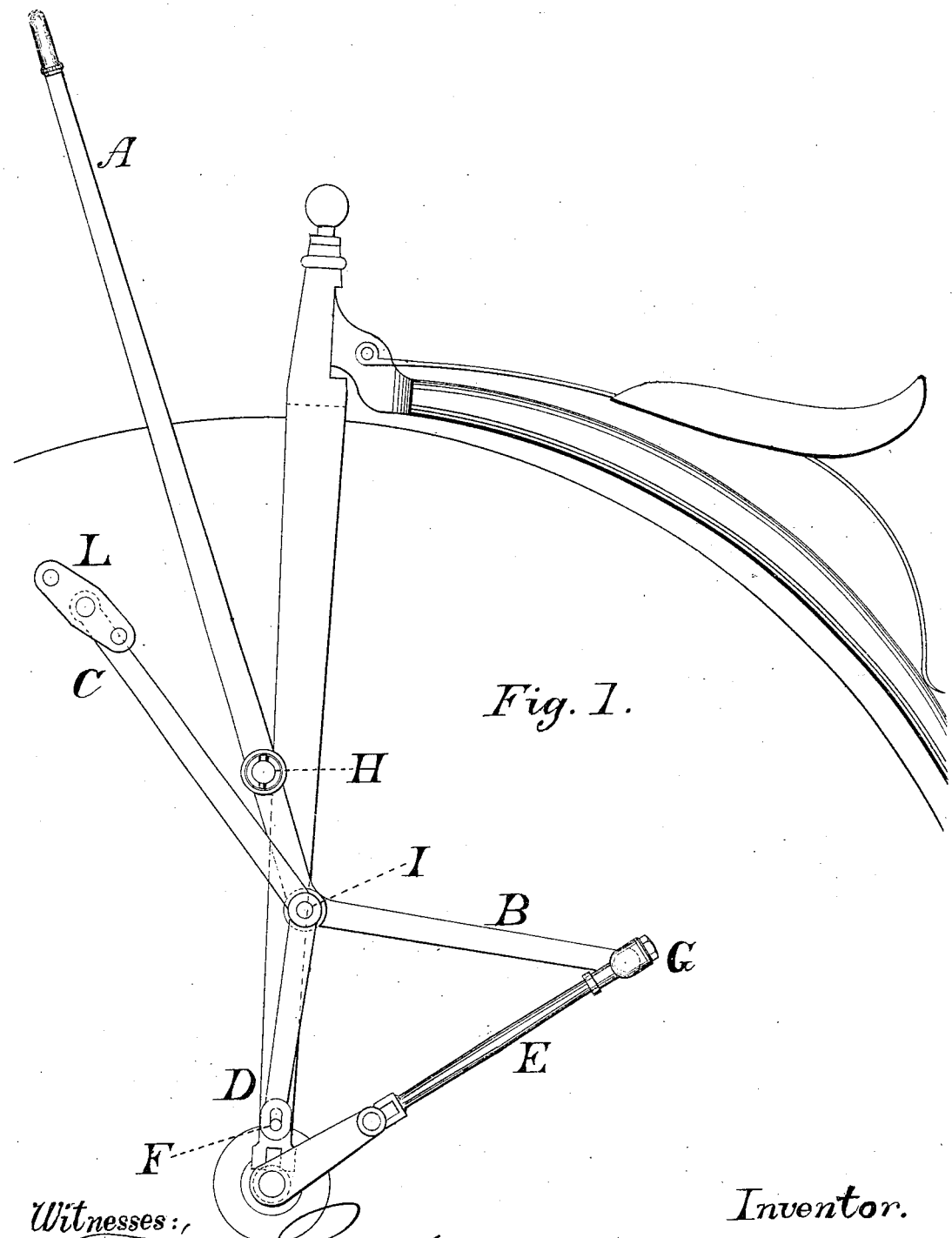

UNITED STATES PATENT OFFICE.

FRANK RITTENHOUSE, OF PROVIDENCE, RHODE ISLAND.

VELOCIPEDE.

SPECIFICATION forming part of Letters Patent No. 266,527, dated October 24, 1882.

Application filed August 28, 1882. (No model.)

To all whom it may concern:

Be it known that I, FRANK RITTENHOUSE, a citizen of the United States, residing at Providence, in the county of Providence and State of Rhode Island, have invented an Improved Method of Propulsion by Hand and Foot Power, of which the following is a specification.

This invention consists in the application of two bent levers, in combination, to the crank of a bicycle, tricycle, or any similar vehicle propelled by hand or foot, on land or water, so that by the use of hands and feet together the power can be greatly increased, and also more conveniently applied. I attain these objects by the mechanism illustrated in the accompanying drawings, in which—

Figure 1 is a side elevation of the improved method as applied to a bicycle. Fig. 2 is a front view of the same, with the exception that the connecting-rod E (shown in Fig. 1) is omitted, so as to show the other parts more clearly. Fig. 3 is a side elevation of the hand-lever. Fig. 4 is a side elevation of the foot-lever. Fig. 5 is a side elevation of that portion of the fork of a bicycle at H, and shows the manner of connecting the hand-lever with the fork of the bicycle or other machine. In Fig. 2 is shown a handle, P, connecting the tops of the hand-levers.

Similar letters refer to similar parts throughout the several views.

The hand-lever A B, in combination with the foot-lever C D, as applied to any machine to be propelled, constitutes my improved method of propulsion. By connecting the foot-lever C D with the hand-lever A B at the point I, and the hand-lever A B at the point H with the fork of the bicycle or machine to be propelled, I concentrate all the power (obtained by moving the hand-levers back and forth, and at the same time pressing with the feet on the foot-treadles L at the upper extremities of the foot-levers C D) at the point G, where, by a ball-joint, the hand-lever is connected with the crank of the machine by the connecting-rod E. The fulcrum of the foot-lever C D is at the pin F, (which is secured to the fork of the machine,) where it slides upon the pin by a slot, as shown in Figs. 1 and 4. The tops of the hand-levers A B taper to fit into sockets in the handle P, so that in case of accident it is instantly detached, as it is held in place only by its position on top of the levers. By pulling the hand-levers forward and at the same time pressing with the feet on the foot-treadles L a great increase of power and an accelerated motion is imparted to the crank of the machine. The constant tension between hands and feet is sufficient to steer the machine.

A larger wheel can be used by this method than in the ordinary bicycle, and the levers can be lengthened to suit the requirements of the rider.

This method of propulsion is equally applicable to boats propelled by paddles and worked by hand or foot.

What I claim as my invention, and desire to secure by Letters Patent, is—

The combination of hand-levers A B with the foot-levers C D and the crank of the bicycle, tricycle, or any similar machine, as shown in the drawings, for the purpose of giving power and motion to the machine, substantially as described.

FRANK RITTENHOUSE.

Witnesses:
FERDINAND POTTER, Jr.,
JAMES W. BLACKWOOD.